United States Patent
Schäfer et al.

(10) Patent No.: US 8,480,898 B2
(45) Date of Patent: *Jul. 9, 2013

(54) MEMBRANE MODULE FOR IMMERSED OPERATION

(75) Inventors: Stefan Schäfer, Aachen (DE); Klaus Vossenkaul, Aachen (DE); Christoph Kullmann, Eschweiler (DE)

(73) Assignee: Koch Membrane Systems GmbH, Aachen (DE)

( * ) Notice: Subject to any disclaimer, the term of this patent is extended or adjusted under 35 U.S.C. 154(b) by 29 days.

This patent is subject to a terminal disclaimer.

(21) Appl. No.: 12/462,409

(22) Filed: Aug. 4, 2009

(65) Prior Publication Data

US 2009/0314704 A1     Dec. 24, 2009

Related U.S. Application Data

(63) Continuation of application No. 11/629,719, filed as application No. PCT/EP2005/006448 on Jun. 16, 2005.

(30) Foreign Application Priority Data

Jun. 17, 2004   (DE) .......................... 10 2004 029 141

(51) Int. Cl.
*B01D 63/02* (2006.01)
*B01D 63/04* (2006.01)
*B01D 61/18* (2006.01)
*B01D 65/08* (2006.01)
*B01D 61/14* (2006.01)

(52) U.S. Cl.
USPC ............ 210/321.69; 210/321.87; 210/321.88; 210/321.89; 210/627; 210/649; 210/636

(58) Field of Classification Search
USPC ................... 210/500.23, 321.69, 321.79–81, 210/321.88, 321.89, 321.9, 636
See application file for complete search history.

(56) References Cited

U.S. PATENT DOCUMENTS 4,876,006 A * 10/1989 Ohkubo et al. .......... 210/321.69
6,331,248 B1 * 12/2001 Taniguchi et al. ......... 210/321.8

(Continued)

FOREIGN PATENT DOCUMENTS

DE    100 45 227    2/2002
EP    0 855 212     7/1998

(Continued)

OTHER PUBLICATIONS

English (Machine) translation of JP 07-185268 (Published in 1995).*

(Continued)

*Primary Examiner* — Krishnan S Menon
(74) *Attorney, Agent, or Firm* — Collard & Roe, P.C.

(57) ABSTRACT

A membrane module for an immersed operation has a fiber bundle of hollow fiber membranes which are cast into a headpiece and in immersed operation are surrounded by a liquid to be filtered. The module has a permeate collection chamber connected to the headpiece with an outlet for permeate draining from the interior of the hollow fiber membranes, and a gas supply having a pipe guided by the headpiece. The pipe terminates in the interior of the fiber bundle and has a gas outlet for a gaseous medium, which after the transfer from the pipe to the liquid to be filtered rises as bubbles between the hollow fiber membranes. The fiber bundle is divided into sections and free spaces remain between the sections which extend from the pipe to the outer circumference of the headpiece and promote an inflow of the liquid into a foot area adjoining the headpiece.

11 Claims, 8 Drawing Sheets

U.S. PATENT DOCUMENTS

2002/0060176 A1 5/2002 Mierau et al.
2003/0057155 A1 3/2003 Husain et al.
2004/0035779 A1 2/2004 Vossenkaul et al.

FOREIGN PATENT DOCUMENTS

| JP | 07/185268 | 7/1995 |
|----|-----------|--------|
| KR | 2002-039383 | 5/2002 |
| WO | WO 97/06880 | 2/1997 |
| WO | WO 00/18498 | 4/2000 |
| WO | WO 2004/101120 | 11/2004 |

OTHER PUBLICATIONS

International Search Report of PCT/EP2005/006448.
English translation of International Preliminary Report on Patentability of PCT/EP2005/006448.

* cited by examiner

Prior Art

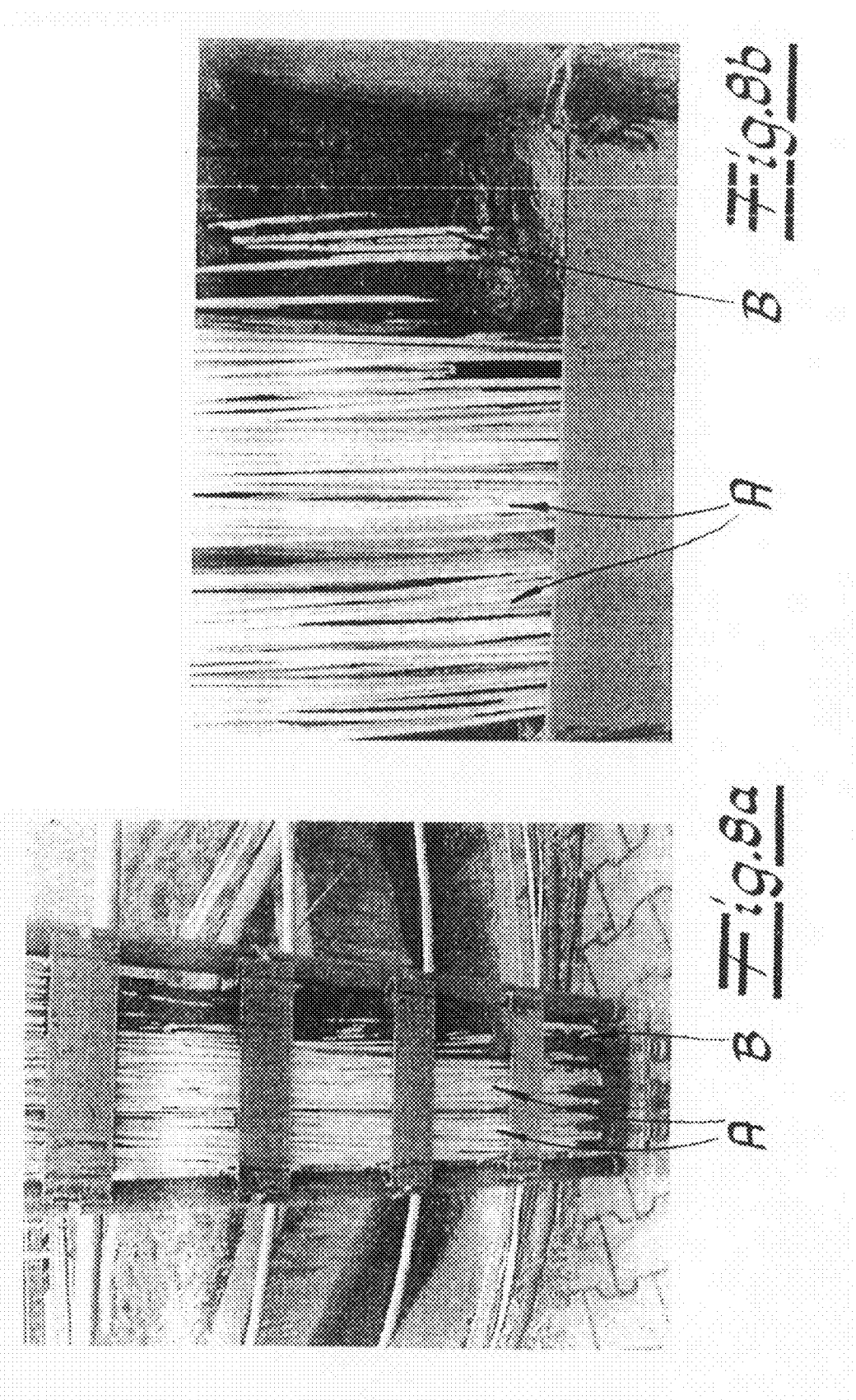

MEMBRANE MODULE FOR IMMERSED OPERATION

CROSS-REFERENCE TO RELATED APPLICATIONS

This is a Continuation of U.S. patent application Ser. No. 11/629,719, filed on Jan. 24, 2007. Applicants also claim priority under 35 U.S.C. 119 of German Patent Application No. DE 10 2004 029,141.1, filed on Jun. 17, 2004, and under 35 U.S.C. 365 of PCT/EP2005/006448, filed on Jun. 16, 2005. The International Application under PCT article 21(2) was not published in English.

BACKGROUND OF THE INVENTION

1. Field of the Invention

The invention relates to a membrane module for immersed operation with a fibre bundle of a large number of hollow fibre membranes which with an open end are cast into a headpiece and in immersed operation are surrounded by a liquid to be filtered, a permeate collection chamber adjoining the headpiece with at least one permeate outlet for the permeate draining from the interior of the hollow fibre membranes and a gas supply having a pipe guided through the headpiece, wherein the pipe terminates in the interior of the fibre bundle and has a gas outlet for a gaseous medium which, after the transition from the pipe into the liquid to be filtered, largely rises between the hollow fibre membranes of the fibre bundle as bubbles.

2. The Prior Art

Hollow fibre membranes refer to capillary-shaped membranes mostly having a length of more than 1 meter and a diameter in the range between 100 μm and 5 mm. For immersed operation the membrane module is lowered into a basin with a liquid to be filtered wherein the hollow fibre membranes are largely vertically oriented in the liquid. With a membrane module operating in immersed operation the permeate is pumped from the permeate collection chamber. As a result, a pressure is maintained in the permeate collection chamber which is lower than the liquid pressure on the outside of the hollow fibre membranes.

A membrane module with the features described at the outset is known from DE-C 100 45 227. The hollow fibre membranes are cast into the headpiece with one end and individually closed on their other end. The permeate collection chamber with headpiece and gas supply forms a foot part which can be mounted to a frame and for immersed operation is lowered into a basin with the liquid to be filtered. The hollow fibre membranes stand in the liquid to be filtered similar to sea grass and can perform movements relative to one another. Merely excessive movements of the fibre bundle are restricted through lateral fibre retainers. When the membrane module is operated dirt accumulates on the membrane surface of the hollow fibre membranes. Through gassing with air, which is introduced into the interior of the fibre bundle through the gas supply pipe, the liquid to be filtered and the hollow fibre membranes are put in motion and the dirt retained on the hollow fibre membranes can be transported away. However, the known measures are not sufficient to permanently avoid sludge accumulation in the foot area of the fibre bundle. The foot area is a section of the fibre bundle adjoining the headpiece in which the hollow fibre membranes can move only to a limited extent because of their end-sided fixing. The sludge accumulation commencing in the foot area of the membrane module continues upwards and over time results in that a more or less large part of the fibre bundle is completely sludged up and can no longer be rinsed clear even through intensive gassing. The gassing air passes the zones of the fibre bundle with increasing sludge accumulation with the result that the sludge accumulation of the fibre bundle progresses rapidly. Sludge accumulation of the fibre bundle commences the earlier the greater the permeate flow and thereby the local dewatering of the sludge.

A membrane module for immersed operation is known from WO 97/06880 the fibre bundle of hollow fibre membranes of which is fixed between two headpieces. The faces of the two headpieces occupied by hollow fibre membranes are divided into sections while free spaces remain between the sections. The free spaces are used for arranging a gas distributor having channels with gas outlet openings adjoining starshape to a pipe. The air largely rises in the free spaces of the fibre bundle where it is intended to bring about swirling of the liquid to be filtered. A similar arrangement is described in JP-A 07/185268 for a membrane module, which is not used in immersed operation but in a jacket pipe through which liquid flows. Sludge accumulation of the fibre bundle cannot be permanently avoided even with the arrangements known from WO 97/06880 and JP-A 07/185268.

SUMMARY OF THE INVENTION

The invention is based on the problem of indicating a membrane module suitable for immersed operation having a low tendency to sludge accumulation. Even with a major dirt load and high permeability of the hollow fibre membranes sludge accumulation starting in the foot area of the fibre bundle is to be prevented.

With a membrane module having the features described at the outset the object is inventively solved in that the fibre bundle is divided into sections each comprising a group of hollow fibre membranes and that free spaces remain between the sections which extend from the pipe to the outer circumference of the headpiece and promote an inflow of the liquid to be filtered in a foot area of the fibre bundle adjoining the headpiece. The gaseous medium, mostly air, is supplied in the interior of the fibre bundle where it generates a flow movement through rising gas bubbles. According to the invention the liquid from the surroundings of the fibre bundle is able to flow in through the free spaces in the foot area of the fibre bundle. This flow has an effect in the sections on the area between the hollow fibre membranes and prevents that sludge accumulation is able to commence there. Deposits can be timely and effectively transported away. The interaction of a central gas supply in the interior of the fibre bundle combined with free spaces within the fibre bundle which extend starshaped or radially from the pipe to the outer circumference of the headpiece prevents in a surprisingly effective manner that sludge accumulation occurs in the foot area of the fibre bundle. The headpiece can be designed as a cylindrical sleeve wherein the pipe of the gas supply is suitably arranged in the cylinder axis.

According to a preferred embodiment of the invention the headpiece has a star-shaped insert surrounding the pipe which divides a face of the headpiece occupied with hollow fibre membranes into sections and forms the free spaces between the sections. The star-shaped insert is cast in the headpiece with the hollow fibre membranes after which it is entirely or partly surrounded by the casting material. It has radial or spirally curved webs which extend from the pipe or from a hub surrounding the pipe to the circumference of the headpiece. These are suitably rounded or bevelled at the top.

To manufacture the membrane module the fibre bundle is inserted in the headpiece and the free space between the headpiece and the hollow fibre membranes cast with a cast resin. Introducing the fibre ends of the hollow fibre membranes into the headpiece can be facilitated through a suitable development of the insert. A suitable development of the teaching according to the invention provides that the insert has a height decreasing from the inside to the outside wherein the core of the insert adjoining the pipe protrudes over the jacket of the headpiece at the face and wherein the connection end of the insert on the jacket side is arranged recessed in the space surrounded by the jacket of the headpiece such that the jacket of the headpiece forms an edge protruding at the top. On introducing the hollow fibre membranes combined into a bundle into the headpiece the fibre ends meeting the insert are deflected to the outside which causes the adjacent fibres to be displaced in the direction of the jacket-side edge so that the bundle is compacted. Sections with hollow fibre membranes in closely concentrated arrangement and evenly distributed over the sections are obtained in this manner. Suitably the edge has an inner surface which conically expands upwards.

In a further development the invention teaches that the star-shaped insert is given an opening for the feeding of casting material which is distributed below the insert and tightly encloses the hollow fibre membranes. The star-shaped insert suitably is a shaped plastic part of a plastic affording sound adhesion to the casting material. The star-shaped insert and the casting material used for casting-in the hollow fibre membranes can also consist of the same material.

According to a preferred embodiment of the invention the gas outlet of the pipe is arranged with a short distance from the headpiece in the foot area of the fibre bundle and designed so that the gaseous medium is discharged from the circumference of the pipe with a largely even distribution. This can be constructively realized in different manners. It is within the scope of the invention that the pipe is closed at the top and has a multiple number of openings on the jacket side. A preferred embodiment provides that a cap closed at the top is arranged on the pipe wherein the pipe and the cap form a flow space for the gaseous medium which is open at the lower end of the cap. The flow space forms a ring gap from which the gaseous medium is discharged with uniform distribution. The air cushion in the flow space prevents the entry of liquid in the pipe and consequently dirt accumulation of the pipe. Within the scope of the teaching according to the invention the pipe can also have an axial outlet opening developed as a nozzle which, for example, is designed in form of a venturi nozzle. Any airflow issuing with high velocity has a considerable suction effect on the surrounding liquid.

According to a preferred embodiment of the invention, the hollow fibre membranes are individually closed at their end facing away from the headpiece and the closed end of the hollow fibre membranes is freely moveable in the liquid. However it is also intended within the scope of the invention that the fibre bundle is fixed between two headpieces wherein a permeate collection chamber can connect to both headpieces.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
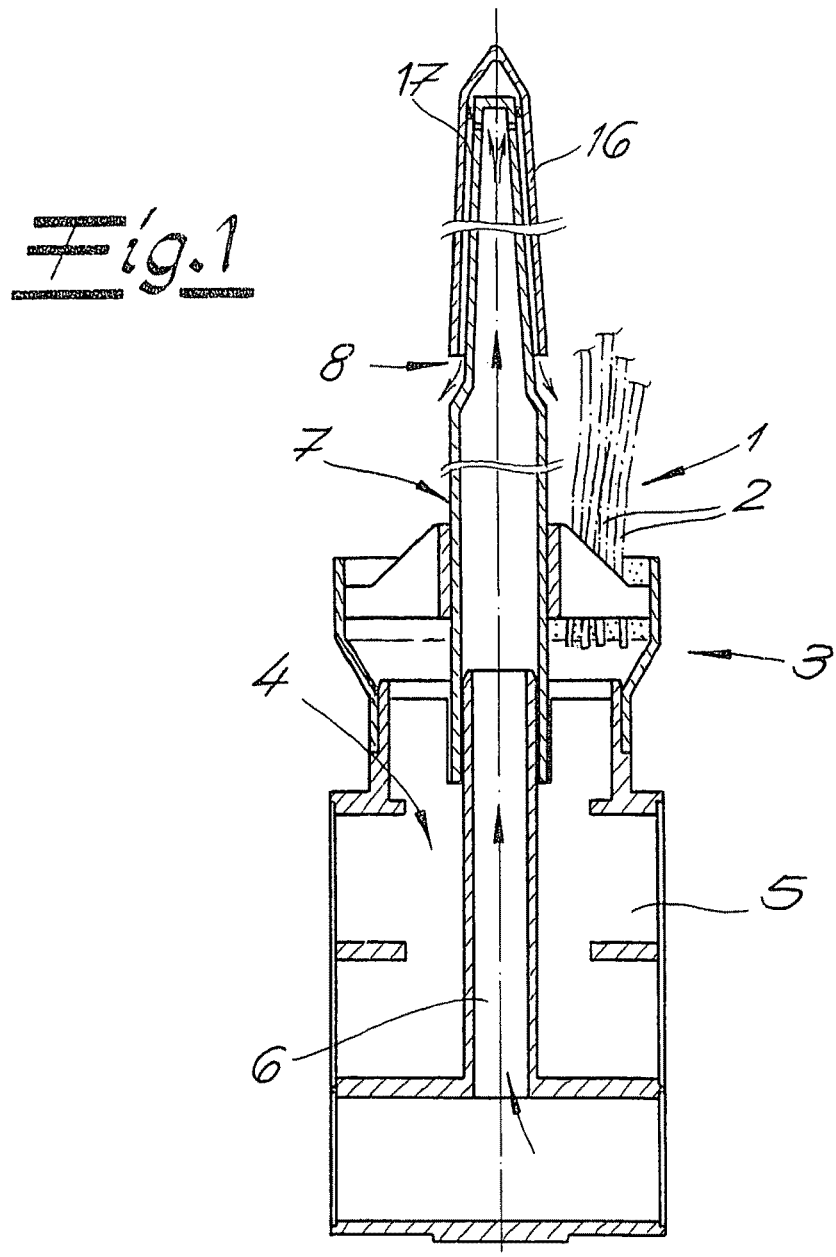
FIG. 1 shows a longitudinal section through a membrane module.

Referring now in detail to the drawings, the membrane module shown in the Figures is intended for immersed operation. In its basic construction it consists of a fibre bundle 1 of a large number of hollow fibre membranes 2 which, with an open end, are cast in a headpiece 3 and in immersed operation are surrounded by a liquid to be filtered, a permeate collection chamber 4 connecting to the headpiece 3 with at least one permeate outlet 5 for the permeate flowing from the interior of the hollow fibre membranes and a gas feed 6 having a pipe 7 guided by the headpiece 3. The pipe 7 terminates in the interior of the fibre bundle 1 and has a gas outlet 8 for a gaseous medium which after the transition from pipe 7 into the liquid to be filtered largely rises between the hollow fibre membranes 2 of the fibre bundle 1 as bubbles. Air is usually employed as gaseous medium.

Figure 2:
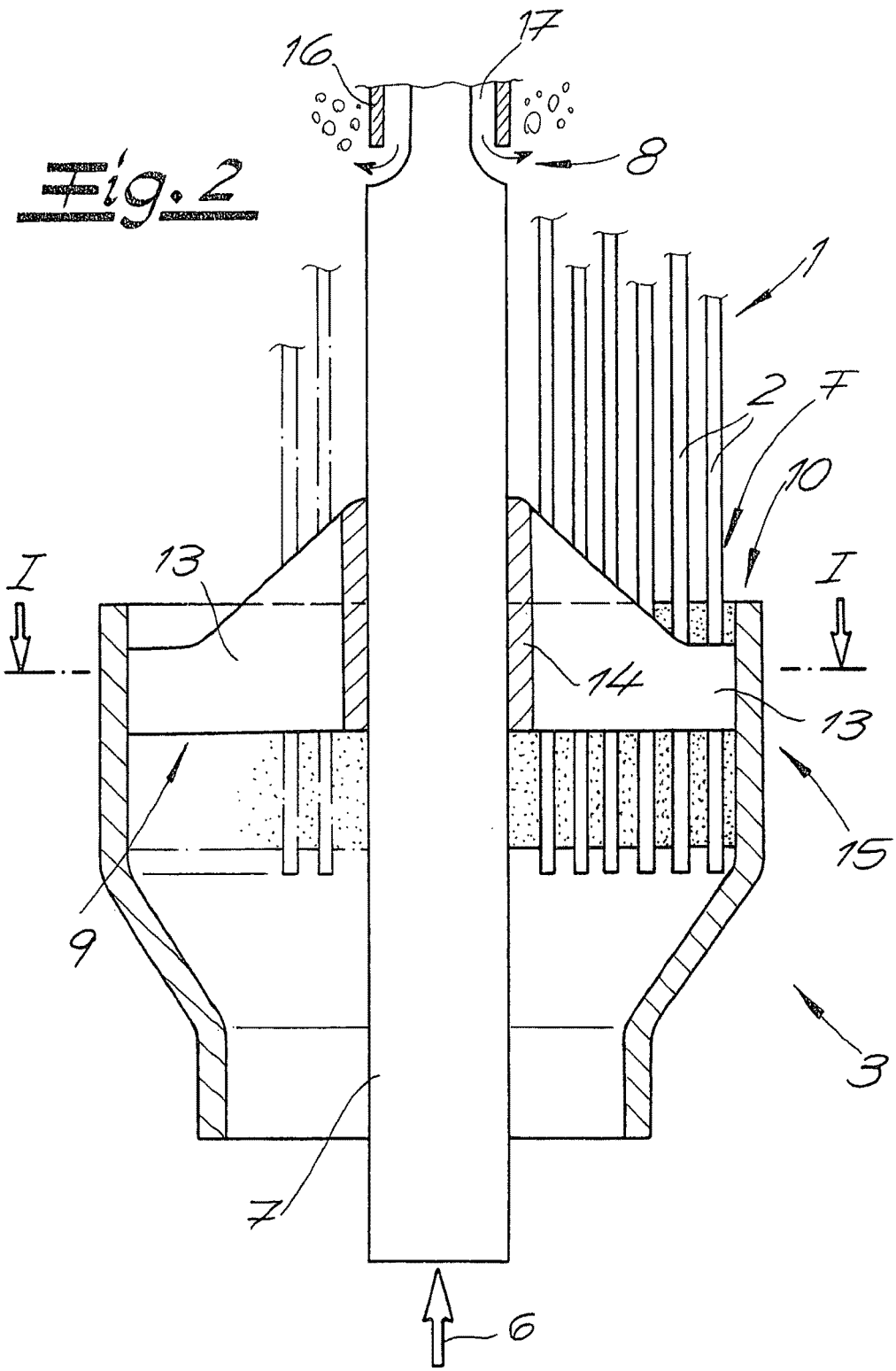
FIG. 2 shows a longitudinal section through a headpiece of the membrane module shown in FIG. 1.
Figure 3:
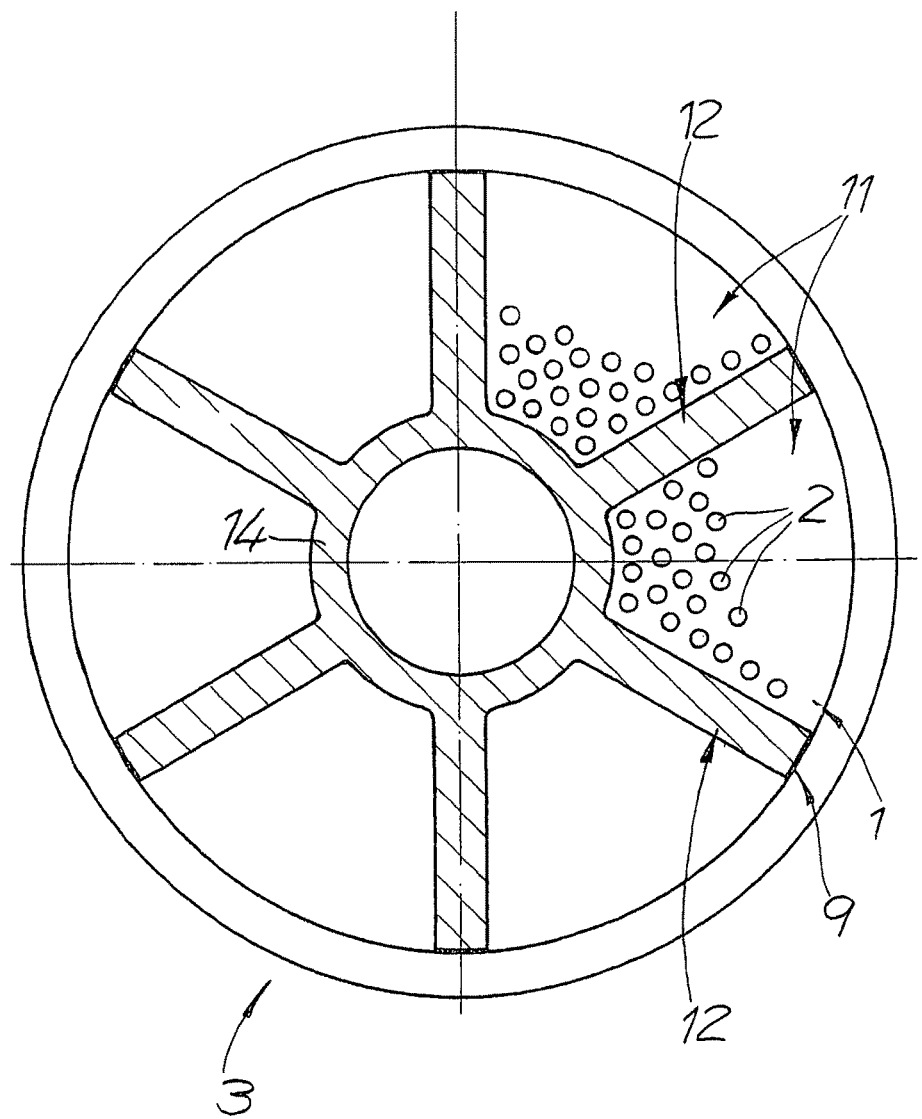
FIG. 3 shows the Section I-I from FIG. 2.

Especially from FIGS. 2 and 3 it is evident that the headpiece 3 has a star-shaped insert 9 surrounding the pipe 7 which forms a face 10 of the headpiece 3 occupied with hollow fibre membranes 2 divided into sections 11 and free spaces 12 between the sections 11. The free spaces 12 between the sections extend from the pipe 7 to the outer circumference of the headpiece 3 and promote inflow of the liquid to be filtered in a foot area F of the fibre bundle 1 adjoining the headpiece 3. Foot area F means a section of the fibre bundle 1 adjoining the headpiece 3 in which the fibres because of their end-sided fixing are only able to perform minor relative movements with respect to one another and in which dirt or sludge accumulation usually commences. The fibre section designated foot area F can extend over approximately 200 mm.

The headpiece 3 is designed as a cylindrical sleeve and in the embodiment example forms a separate part which is fitted to the permeate collection chamber 4. However, the headpiece 3 could also be moulded onto the permeate collection chamber 4. The pipe 7 of the gas feed 6 is arranged in the cylinder axis of the sleeve and surrounded by the hollow fibre membranes 2 of the fibre bundle 1. The star-shaped insert 9 of the headpiece 3 has radial webs 13 which extend from a hub 14 surrounding the pipe 7 to the circumference of the headpiece 3. At the top the webs 13 are rounded or bevelled. In addition it is evident from the presentation in FIG. 2 that the insert 9 has a height which decreases from the inside to the outside wherein the core of the insert 9 adjoining the pipe protrudes over the jacket of the headpiece 3 at the face and wherein the jacket-side connection end of the insert is arranged recessed in the space surrounded by the jacket of the headpiece 3 such that the jacket of the headpiece 3 forms an edge 15 protruding at the top. The edge 15 has an inner surface which expands conically upwards. The described formation of the headpiece 3 and the insert 9 facilitates the introduction of the fibre bundle 1 in the headpiece 3 during the course of the module manufacture.

Figure 4:
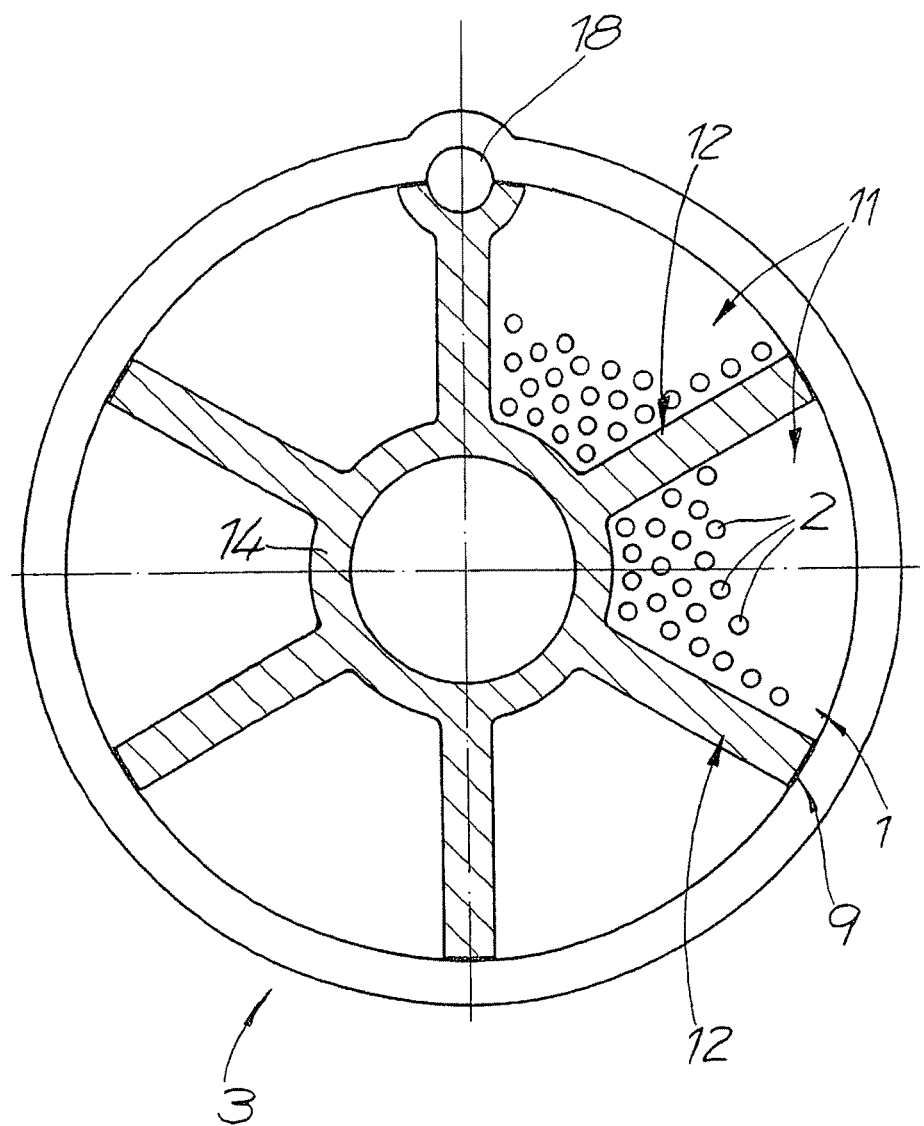
FIG. 4 shows a further development of the headpiece in top view.
Figure 5:
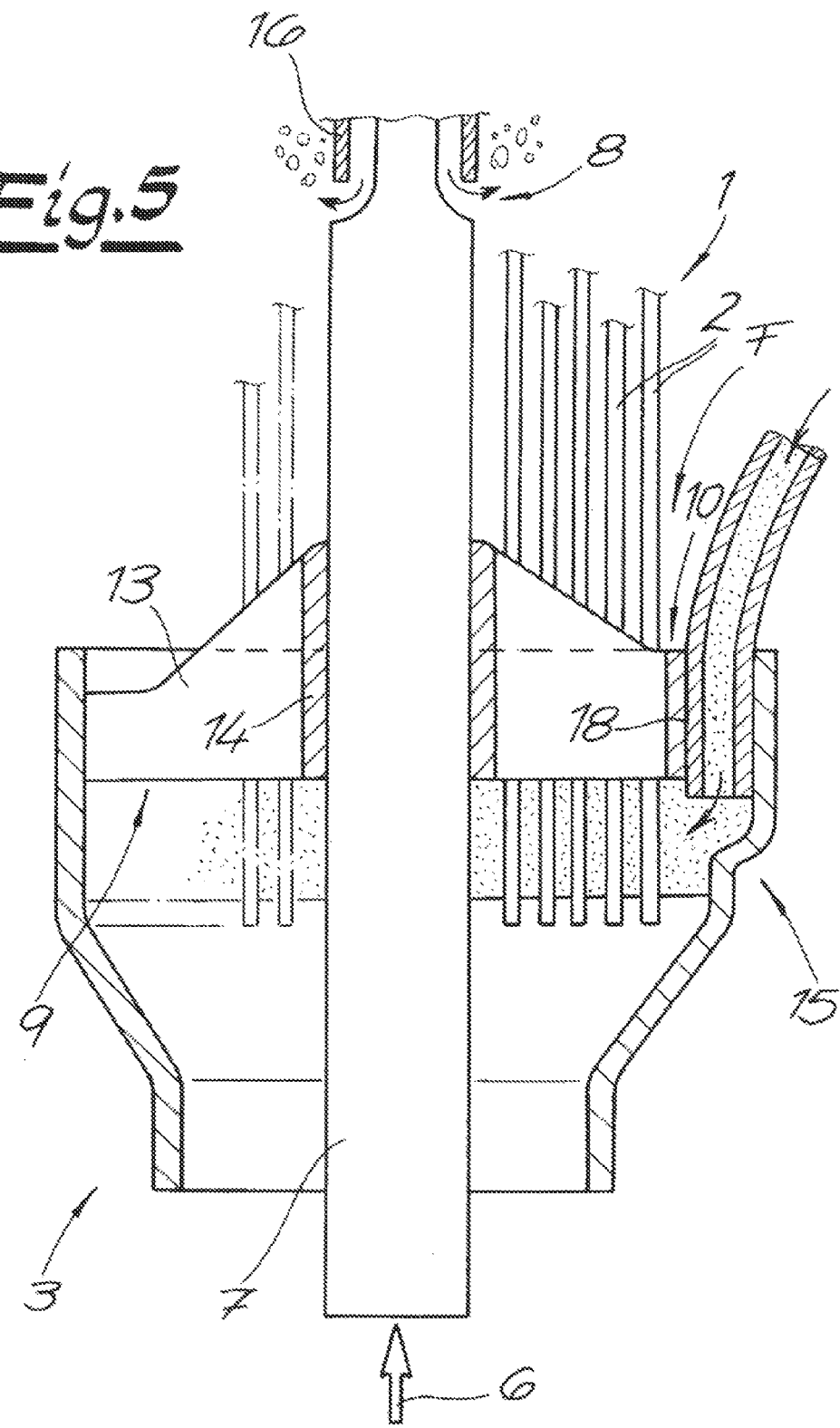
FIG. 5 shows a longitudinal section through the headpiece shown in FIG. 4, more specifically during the application of the casting material during the course of the headpiece manufacture.

The star-shaped insert 9 is cast in the headpiece 3 with the hollow fibre membranes 2 after which it is entirely or partly surrounded by casting material. In the embodiment shown in FIG. 4 the star-shaped insert 9 is given an opening 18 for the feeding of casting material which spreads below the insert 9 and tightly surrounds the hollow fibre membranes 2. The casting process is shown in FIG. 5. The star-shaped insert 9 is designed as a shaped plastic part and consists of a plastic having a sound adhesion affinity to the casting material. The star-shaped insert 9 and the casting material used for casting in the hollow fibre membrane 2 can also consist of the same material.

Figure 6:
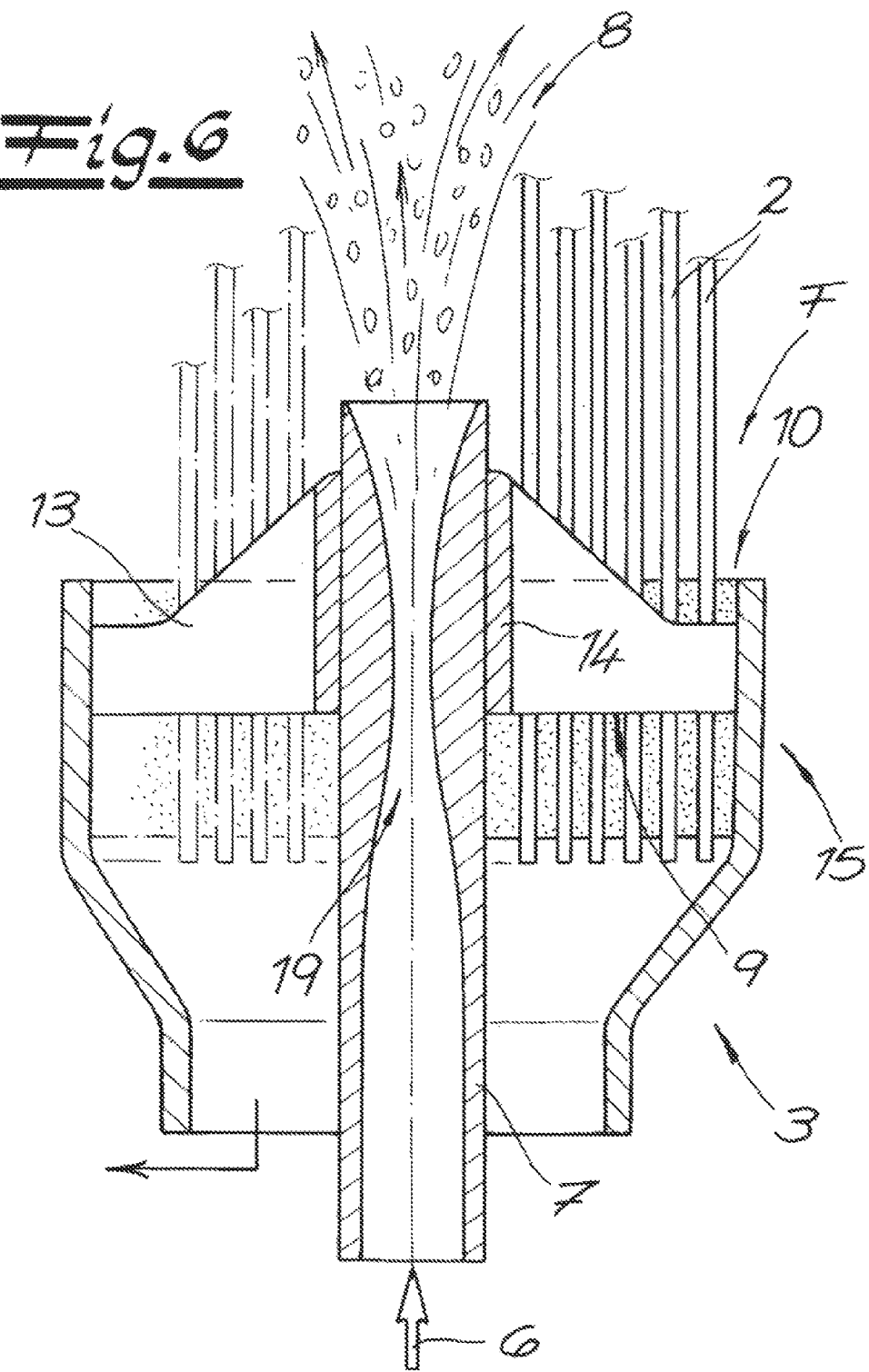
FIG. 6 shows a further embodiment example in longitudinal section.

The gas outlet 8 of the pipe 7 is arranged at a short distance from the headpiece 3 in the foot area of the fibre bundle 1 and designed so that the gaseous medium is discharged from the circumference of the pipe 7 in largely uniform distribution. A preferred design form is shown in FIG. 1. A cap 16 closed at the top is arranged on the pipe 7 wherein the pipe 7 and the cap 16 form a flow space 17 for the gaseous medium which is open at the lower end of the cap. In the embodiment example of FIG. 6 the pipe 7 has an axial outlet opening designed as a nozzle, e.g. as a venturi nozzle 19. The gaseous medium discharged at a high flow velocity has a jet pump effect on the surrounding liquid.

Figure 7:
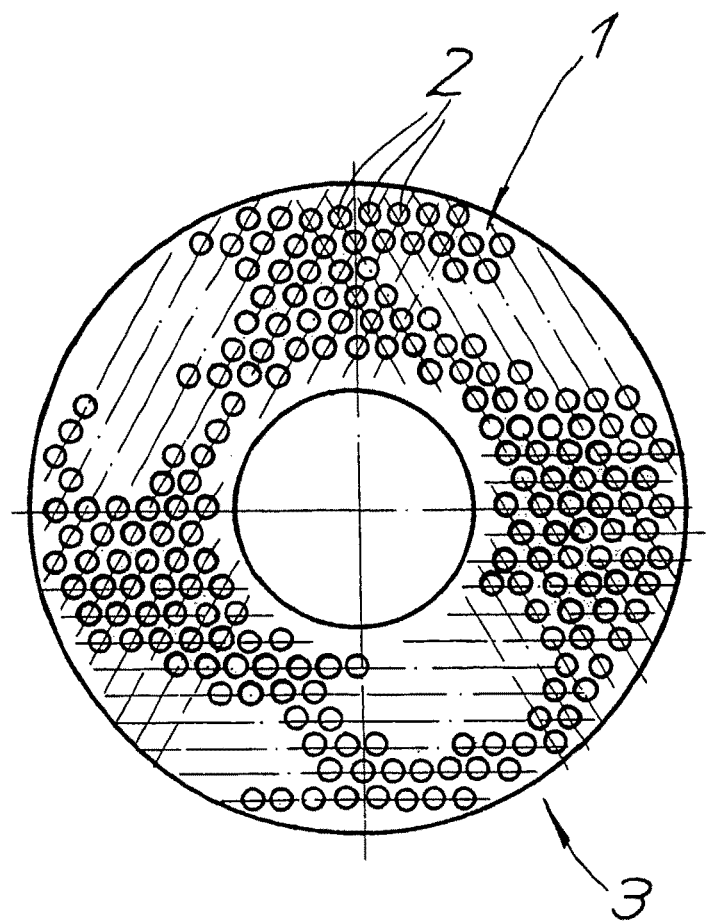
FIG. 7 shows a membrane module according to the prior art in a representation corresponding to FIG. 3, and FIGS. 8a, 8b show a comparison of the dirt accumulation of a membrane module according to the invention and a membrane module according to the prior art.

Test Results:

For testing purposes, two membrane modules designed according to the invention and a membrane module according to the prior art were operated under identical conditions. FIG. 3 shows the fibre distribution of the membrane modules according to the invention and FIG. 7 the fibre distribution of the membrane module according to the prior art used as comparison. The membrane modules do not differ in terms of the gas supply.

The liquid to be filtered had a solids content of 3.5 g/l (dry substance) which was increased to approximately 12 g/l within 24 hours. The membrane modules were operated with varying permeate flows over a period of nine days with identical ventilation.

The following permanent flows were set as variation of the trans-membrane pressure differential: TABLE-US-00001 Day Permeate flow (1/m.sup.2/h) 1 to 2 14 1/m.sup.2/h 3 to 5 17 1/m.sup.2/h 6 20 1/m.sup.2/h 7 22 1/m.sup.2/h 8 to 9 25 1/m.sup.2/h Even after four days with minor permeate flows an increased tendency toward sludge accumulation was observed in the fibre bundle of the comparative module. When the permeate flow was increased the sludge accumulation of the comparative module progressed rapidly while the fibre bundles of the membrane modules according to the invention did not show any dirt accumulation. FIGS. 8*a* and 8*b* show the fibre bundles after conclusion of the nine-day test operation. The fibre bundles A of the two membrane modules according to the invention do not show any significant dirt accumulation even in the foot area while the fibre bundle B of the comparative module is covered in sludge from the bottom to the top.

Accordingly, while only a few embodiments of the present invention have been shown and described, it is obvious that many changes and modifications may be made thereunto without departing from the spirit and scope of the invention.

What is claimed is:

1. A membrane module suitable for immersed operation comprising:
    a headpiece adapted to be lowered into a basin with liquid to be filtered;
    a fibre bundle consisting of a large number of hollow fibre membranes which are cast into the headpiece with an open end and in immersed operation are surrounded by the liquid to be filtered,
    a permeate collection chamber connecting to the headpiece with at least one permeate outlet for the permeate draining from the interior of the hollow fibre membranes and
    a gas supply having a pipe guided through the headpiece,
    wherein the hollow fibre membranes have individually closed ends facing away from the headpiece which are freely movable in the liquid,
    wherein the pipe terminates in the interior of the fibre bundle and has a gas outlet for a gaseous medium which after the transition from the pipe to the liquid to be filtered largely rises between the hollow fibre membranes of the fibre bundle as bubbles, wherein the gas outlet is designed so that the gaseous medium is discharged from a circumference of the pipe with a largely uniform distribution, wherein the fibre bundle is divided into sections each comprising a group of hollow fibre membranes, and wherein the sections are separated by radial free spaces, said free spaces extending from the pipe to the outer circumference of the headpiece and promoting an inflow of the liquid to be filtered into a foot area of the fibre bundle adjoining the headpiece.

2. The membrane module according to claim 1, wherein the headpiece is designed as a cylindrical sleeve and the pipe of the gas supply is arranged in the cylinder axis.

3. The membrane module according to claims 1, wherein the headpiece has a star-shaped insert surrounding the pipe which divides a face of the headpiece occupied with hollow fibre membranes into sections and forms the free spaces between the sections.

4. The membrane module according to claim 3, wherein the star-shaped insert of the headpiece has radial webs which extend from the pipe or from a hub surrounding the pipe to the circumference of the headpiece.

5. The membrane module according to claim 4, wherein the webs are rounded or beveled at the top.

6. The membrane module according to claim 3, wherein the insert has a height decreasing from the inside to the outside, and wherein the core of the insert adjoining the pipe protrudes the jacket of the headpiece at the face and wherein the jacket-side connection end of the insert is arranged recessed in the space enclosed by the jacket of the headpiece such that the jacket of the headpiece forms an edge protruding at the top.

7. The membrane module according to claim 6, wherein the edge has an interior surface conically expanding upwards.

8. The membrane module according to claim 3, wherein the star-shaped insert includes an opening for the feeding of casting material which spreads below the insert and tightly encloses the hollow fibre membranes.

9. The membrane module according to claim 3, wherein the star-shaped insert and the casting material used for casting-in the hollow fibre membranes consist of the same material.

10. A membrane module suitable for immersed operation comprising:
    a headpiece adapted to be lowered into a basin with liquid to be filtered;

a fibre bundle consisting of a large number of hollow fibre membranes which are cast into the headpiece with an open end and in immersed operation are surrounded by the liquid to be filtered;

a permeate collection chamber connected to the headpiece with at least one permeate outlet for the permeate draining from the interior of the hollow fibre membranes; and a gas supply having a pipe guided through the headpiece, wherein the hollow fibre membranes have individually closed ends facing away from the headpiece which are freely movable in the liquid, wherein the pipe terminates in the interior of the fibre bundle and has an axial outlet opening formed as a nozzle for a gaseous medium which after the transition from the pipe to the liquid to be filtered largely rises between the hollow fibre membranes of the fibre bundle as bubbles, wherein the fibre bundle is divided into sections each comprising a group of hollow fibre membranes, and wherein the sections are separated by radial free spaces, said free spaces extending from the pipe to the outer circumference of the headpiece and promoting an inflow of the liquid to be filtered into a foot area of the fibre bundle adjoining the headpiece.

11. A membrane module suitable for immersed operation comprising:

a headpiece adapted to be lowered into a basin with liquid to be filtered;

a fibre bundle consisting of a large number of hollow fibre membranes which are cast into the headpiece with an open end and in immersed operation are surrounded by the liquid to be filtered;

a permeate collection chamber connection to the headpiece with at least one permeate outlet for the permeate draining from the interior of the hollow fibre membranes; and a gas supply having a pipe guided through the headpiece, wherein the hollow fibre membranes have individually closed ends facing away from the headpiece which are freely movable in the liquid, wherein the pipe terminates in the interior of the fibre bundle and has an axial outlet opening formed as a venturi nozzle for a gaseous medium which after the transition from the pipe to the liquid to be filtered largely rises between the hollow fibre membranes of the fibre bundle as bubbles, wherein the fibre bundle is divided into sections each comprising a group of hollow fibre membranes, and wherein the sections are separated by radial free spaces, said free spaces extending form the pipe to the outer circumference of the headpiece and promoting an inflow of the liquid to be filtered into a foot area of the fibre bundle adjoining the headpiece.

* * * * *